US011675657B2

United States Patent
Ware et al.

(10) Patent No.: US 11,675,657 B2
(45) Date of Patent: *Jun. 13, 2023

(54) ENERGY-EFFICIENT ERROR-CORRECTION-DETECTION STORAGE

(71) Applicant: Rambus Inc., San Jose, CA (US)

(72) Inventors: Frederick A. Ware, Los Altos Hills, CA (US); John E. Linstadt, Palo Alto, CA (US); Liji Gopalakrishnan, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,735

(22) Filed: Apr. 15, 2022

(65) Prior Publication Data

US 2022/0291992 A1 Sep. 15, 2022

Related U.S. Application Data

(63) Continuation of application No. 16/832,263, filed on Mar. 27, 2020, now Pat. No. 11,327,831, which is a continuation of application No. 15/963,163, filed on Apr. 26, 2018, now Pat. No. 10,613,924.

(60) Provisional application No. 62/507,514, filed on May 17, 2017.

(51) Int. Cl.
G06F 11/10 (2006.01)
G06F 3/06 (2006.01)

(52) U.S. Cl.
CPC .......... *G06F 11/1004* (2013.01); *G06F 3/064* (2013.01); *G06F 3/0619* (2013.01); *G06F 3/0673* (2013.01)

(58) Field of Classification Search
None
See application file for complete search history.

(56) References Cited

U.S. PATENT DOCUMENTS

| 6,262,924 B1 | 7/2001 | Fukutani et al. |
| 7,877,665 B2 | 1/2011 | Mokhlesi |
| 10,613,924 B2 | 4/2020 | Ware et al. |
| 11,327,831 B2 * | 5/2022 | Ware ................... G06F 11/1004 |
| 2008/0163028 A1 | 7/2008 | Mokhlesi |
| 2009/0019321 A1 | 1/2009 | Radke |
| 2009/0019340 A1 | 1/2009 | Radke et al. |

(Continued)

OTHER PUBLICATIONS

Doe Hyun et al. "Virtualized and Flexible ECC for Main Memory", Fifteenth International Conference on Architectural Support for Programming Languages and Operating Systems (ASPLOS), Mar. 17, 2010. 26 pages.

*Primary Examiner* — Guerrier Merant
(74) *Attorney, Agent, or Firm* — Silicon Edge Law Group LLP; Arthur J. Behiel

(57) ABSTRACT

A memory system employs an addressing scheme to logically divide rows of memory cells into separate contiguous regions, one for data storage and another for error detection and correction (EDC) codes corresponding to that data. Data and corresponding EDC codes are stored in the same row of the same bank. Accessing data and corresponding EDC code in the same row of the same bank advantageously saves power and avoids bank conflicts. The addressing scheme partitions the memory without requiring the requesting processor to have an understanding of the memory partition.

20 Claims, 13 Drawing Sheets

(56) References Cited

U.S. PATENT DOCUMENTS

| | | |
|---|---|---|
| 2010/0235695 A1 | 9/2010 | Lee et al. |
| 2011/0209028 A1 | 8/2011 | Post et al. |
| 2012/0311406 A1 | 12/2012 | Ratnam et al. |
| 2013/0080856 A1 | 3/2013 | Bueb |
| 2013/0086312 A1 | 4/2013 | Miura |
| 2014/0047246 A1 | 2/2014 | Seol et al. |
| 2014/0108889 A1 | 4/2014 | Shaeffer |
| 2015/0067448 A1 | 3/2015 | Son et al. |
| 2016/0005452 A1 | 1/2016 | Bae et al. |

* cited by examiner

600 →    Apso = 111b    128 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 111 | 000 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 111 | 001 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 111 | 010 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| 011 | 100 | 0 | 011 | 100 |
| 011 | 101 | 0 | 011 | 101 |
| 011 | 110 | 0 | 011 | 110 |
| 011 | 111 | 1 | 111 | 011 |

| Aps[2:0] | Apc[2:0] | Apc=111 | Ams[2:0] | Amc[2:0] |
|---|---|---|---|---|
| 100 | 000 | 0 | 100 | 000 |
| 100 | 001 | 0 | 100 | 001 |
| 100 | 010 | 0 | 100 | 010 |
| 100 | 011 | 0 | 100 | 011 |
| 100 | 100 | 0 | 100 | 100 |
| 100 | 101 | 0 | 100 | 101 |
| 100 | 110 | 0 | 100 | 110 |
| 100 | 111 | 1 | 111 | 100 |
| 101 | 000 | 0 | 101 | 000 |
| 101 | 001 | 0 | 101 | 001 |
| 101 | 010 | 0 | 101 | 010 |
| 101 | 011 | 0 | 101 | 011 |
| 101 | 100 | 0 | 101 | 100 |
| 101 | 101 | 0 | 101 | 101 |
| 101 | 110 | 0 | 101 | 110 |
| 101 | 111 | 1 | 111 | 101 |
| 110 | 000 | 0 | 110 | 000 |
| 110 | 001 | 0 | 110 | 001 |
| 110 | 010 | 0 | 110 | 010 |
| 110 | 011 | 0 | 110 | 011 |
| 110 | 100 | 0 | 110 | 100 |
| 110 | 101 | 0 | 110 | 101 |
| 110 | 110 | 0 | 110 | 110 |
| 110 | 111 | 1 | 111 | 110 |
| ~~111~~ | ~~000~~ | 0 | 111 | 000 |
| ~~111~~ | ~~001~~ | 0 | 111 | 001 |
| ~~111~~ | ~~010~~ | 0 | 111 | 010 |
| ~~111~~ | ~~011~~ | 0 | 111 | 011 |
| ~~111~~ | ~~100~~ | 0 | 111 | 100 |
| ~~111~~ | ~~101~~ | 0 | 111 | 101 |
| ~~111~~ | ~~110~~ | 0 | 111 | 110 |
| 111 | 111 | 1 | 111 | 111 |

Apso =101b    96 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 101 | 010 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 101 | 011 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 101 | 100 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| 011 | 100 | 0 | 011 | 100 |
| 011 | 101 | 0 | 011 | 101 |
| 011 | 110 | 0 | 011 | 110 |
| 011 | 111 | 1 | 101 | 101 |

| Aps[2:0] | Apc[2:0] | Apc=111 | Ams[2:0] | Amc[2:0] |
|---|---|---|---|---|
| 100 | 000 | 0 | 100 | 000 |
| 100 | 001 | 0 | 100 | 001 |
| 100 | 010 | 0 | 100 | 010 |
| 100 | 011 | 0 | 100 | 011 |
| 100 | 100 | 0 | 100 | 100 |
| 100 | 101 | 0 | 100 | 101 |
| 100 | 110 | 0 | 100 | 110 |
| 100 | 111 | 1 | 101 | 110 |
| 101 | 000 | 0 | 101 | 000 |
| 101 | 001 | 0 | 101 | 001 |
| 101 | 010 | 0 | 101 | 010 |
| 101 | 011 | 0 | 101 | 011 |
| 101 | 100 | 0 | 101 | 100 |
| 101 | 101 | 0 | 101 | 101 |
| 101 | 110 | 0 | 101 | 110 |
| 101 | 111 | 1 | 101 | 111 |
| 110 | 000 | 0 | 110 | 000 |
| 110 | 001 | 0 | 110 | 001 |
| 110 | 010 | 0 | 110 | 010 |
| 110 | 011 | 0 | 110 | 011 |
| 110 | 100 | 0 | 110 | 100 |
| 110 | 101 | 0 | 110 | 101 |
| 110 | 110 | 0 | 110 | 110 |
| 110 | 111 | 1 | 111 | 110 |
| 111 | 000 | 0 | 111 | 000 |
| 111 | 001 | 0 | 111 | 001 |
| 111 | 010 | 0 | 111 | 010 |
| 111 | 011 | 0 | 111 | 011 |
| 111 | 100 | 0 | 111 | 100 |
| 111 | 101 | 0 | 111 | 101 |
| 111 | 110 | 0 | 111 | 110 |
| 111 | 111 | 1 | 111 | 111 |

Apso =100b                    80 slices

| Aps[2:0] | Apc[2:0] | Apc=111 | Ams[2:0] | Amc[2:0] | Aps[2:0] | Apc[2:0] | Apc=111 | Ams[2:0] | Amc[2:0] |
|---|---|---|---|---|---|---|---|---|---|
| 000 | 000 | 0 | 000 | 000 | 100 | 000 | 0 | 100 | 000 |
| 000 | 001 | 0 | 000 | 001 | 100 | 001 | 0 | 100 | 001 |
| 000 | 010 | 0 | 000 | 010 | 100 | 010 | 0 | 100 | 010 |
| 000 | 011 | 0 | 000 | 011 | 100 | 011 | 0 | 100 | 011 |
| 000 | 100 | 0 | 000 | 100 | 100 | 100 | 0 | 100 | 100 |
| 000 | 101 | 0 | 000 | 101 | 100 | 101 | 0 | 100 | 101 |
| 000 | 110 | 0 | 000 | 110 | 100 | 110 | 0 | 100 | 110 |
| 000 | 111 | 1 | 100 | 011 | 100 | 111 | 1 | 100 | 111 |
| 001 | 000 | 0 | 001 | 000 | 101 | 000 | 0 | 101 | 000 |
| 001 | 001 | 0 | 001 | 001 | 101 | 001 | 0 | 101 | 001 |
| 001 | 010 | 0 | 001 | 010 | 101 | 010 | 0 | 101 | 010 |
| 001 | 011 | 0 | 001 | 011 | 101 | 011 | 0 | 101 | 011 |
| 001 | 100 | 0 | 001 | 100 | 101 | 100 | 0 | 101 | 100 |
| 001 | 101 | 0 | 001 | 101 | 101 | 101 | 0 | 101 | 101 |
| 001 | 110 | 0 | 001 | 110 | 101 | 110 | 0 | 101 | 110 |
| 001 | 111 | 1 | 100 | 100 | 101 | 111 | 1 | 101 | 111 |
| 010 | 000 | 0 | 010 | 000 | 110 | 000 | 0 | 110 | 000 |
| 010 | 001 | 0 | 010 | 001 | 110 | 001 | 0 | 110 | 001 |
| 010 | 010 | 0 | 010 | 010 | 110 | 010 | 0 | 110 | 010 |
| 010 | 011 | 0 | 010 | 011 | 110 | 011 | 0 | 110 | 011 |
| 010 | 100 | 0 | 010 | 100 | 110 | 100 | 0 | 110 | 100 |
| 010 | 101 | 0 | 010 | 101 | 110 | 101 | 0 | 110 | 101 |
| 010 | 110 | 0 | 010 | 110 | 110 | 110 | 0 | 110 | 110 |
| 010 | 111 | 1 | 100 | 101 | 110 | 111 | 1 | 111 | 110 |
| 011 | 000 | 0 | 011 | 000 | 111 | 000 | 0 | 111 | 000 |
| 011 | 001 | 0 | 011 | 001 | 111 | 001 | 0 | 111 | 001 |
| 011 | 010 | 0 | 011 | 010 | 111 | 010 | 0 | 111 | 010 |
| 011 | 011 | 0 | 011 | 011 | 111 | 011 | 0 | 111 | 011 |
| 011 | 100 | 0 | 011 | 100 | 111 | 100 | 0 | 111 | 100 |
| 011 | 101 | 0 | 011 | 101 | 111 | 101 | 0 | 111 | 101 |
| 011 | 110 | 0 | 011 | 110 | 111 | 110 | 0 | 111 | 110 |
| 011 | 111 | 1 | 100 | 110 | 111 | 111 | 1 | 111 | 111 |

Apso =011b    64 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 011 | 100 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 011 | 101 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 011 | 110 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| ~~011~~ | ~~100~~ | 0 | 011 | 100 |
| ~~011~~ | ~~101~~ | 0 | 011 | 101 |
| ~~011~~ | ~~110~~ | 0 | 011 | 110 |
| ~~011~~ | ~~111~~ | 1 | 011 | 111 |

Apso =010b    48 slices

| Aps[2:0] | Apc[2:0] | Apc=111 | Ams[2:0] | Amc[2:0] |
|---|---|---|---|---|
| 000 | 000 | 0 | 0 | 000 |
| 000 | 001 | 0 | 0 | 001 |
| 000 | 010 | 0 | 0 | 010 |
| 000 | 011 | 0 | 0 | 011 |
| 000 | 100 | 0 | 0 | 100 |
| 000 | 101 | 0 | 0 | 101 |
| 000 | 110 | 0 | 0 | 110 |
| 000 | 111 | 1 | 010 | 101 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 010 | 110 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 010 | 111 |
| ~~011~~ | ~~000~~ | 0 | ~~011~~ | ~~000~~ |
| ~~011~~ | ~~001~~ | 0 | ~~011~~ | ~~001~~ |
| ~~011~~ | ~~010~~ | 0 | ~~011~~ | ~~010~~ |
| ~~011~~ | ~~011~~ | 0 | ~~011~~ | ~~011~~ |
| ~~011~~ | ~~100~~ | 0 | ~~011~~ | ~~100~~ |
| ~~011~~ | ~~101~~ | 0 | ~~011~~ | ~~101~~ |
| ~~011~~ | ~~110~~ | 0 | ~~011~~ | ~~110~~ |
| ~~011~~ | ~~111~~ | 1 | ~~011~~ | ~~111~~ |

Apso =001b  32 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 001 | 110 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 001 | 111 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 011 | 110 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| 011 | 100 | 0 | 011 | 100 |
| 011 | 101 | 0 | 011 | 101 |
| 011 | 110 | 0 | 011 | 110 |
| 011 | 111 | 1 | 011 | 111 |

Apso =000b  16 slices

| Aps[2:0] | Apc[2:0] | Apc=111 | Ams[2:0] | Amc[2:0] |
|---|---|---|---|---|
| 000 | 000 | 0 | 000 | 000 |
| 000 | 001 | 0 | 000 | 001 |
| 000 | 010 | 0 | 000 | 010 |
| 000 | 011 | 0 | 000 | 011 |
| 000 | 100 | 0 | 000 | 100 |
| 000 | 101 | 0 | 000 | 101 |
| 000 | 110 | 0 | 000 | 110 |
| 000 | 111 | 1 | 000 | 111 |
| 001 | 000 | 0 | 001 | 000 |
| 001 | 001 | 0 | 001 | 001 |
| 001 | 010 | 0 | 001 | 010 |
| 001 | 011 | 0 | 001 | 011 |
| 001 | 100 | 0 | 001 | 100 |
| 001 | 101 | 0 | 001 | 101 |
| 001 | 110 | 0 | 001 | 110 |
| 001 | 111 | 1 | 010 | 110 |
| 010 | 000 | 0 | 010 | 000 |
| 010 | 001 | 0 | 010 | 001 |
| 010 | 010 | 0 | 010 | 010 |
| 010 | 011 | 0 | 010 | 011 |
| 010 | 100 | 0 | 010 | 100 |
| 010 | 101 | 0 | 010 | 101 |
| 010 | 110 | 0 | 010 | 110 |
| 010 | 111 | 1 | 010 | 111 |
| 011 | 000 | 0 | 011 | 000 |
| 011 | 001 | 0 | 011 | 001 |
| 011 | 010 | 0 | 011 | 010 |
| 011 | 011 | 0 | 011 | 011 |
| 011 | 100 | 0 | 011 | 100 |
| 011 | 101 | 0 | 011 | 101 |
| 011 | 110 | 0 | 011 | 110 |
| 011 | 111 | 1 | 011 | 111 |

FIG. 12

ENERGY-EFFICIENT ERROR-CORRECTION-DETECTION STORAGE

FIELD OF THE INVENTION

The subject matter presented herein relates generally to computer memory.

BACKGROUND

Personal computers, workstations, and servers commonly include at least one processor, such as a central processing unit (CPU), and some form of memory system that includes dynamic, random-access memory (DRAM). The processor executes instructions and manipulates data stored in the DRAM.

DRAM stores binary bits by alternatively charging or discharging capacitors to represent the logical values one and zero. The capacitors are exceedingly small. Their ability to store charge can be hindered by manufacturing variations or operational stresses, and their stored charges can be upset by electrical interference or high-energy particles. The resultant changes to the stored instructions and data produce undesirable computational errors. Some computer systems, such as high-end servers, employ various forms of error detection and correction to manage DRAM errors, or even more permanent memory failures.

BRIEF DESCRIPTION OF THE DRAWINGS

FIG. 6 is a table 600 illustrating how mapping logic 500 of FIG. 5 maps physical addresses Aps[2:0] and Apc[2:0] to memory addresses Ams[2:0] and Amc[2:0] when register 505 is loaded with a configuration value Apso=111b.

FIG. 7 is a table 700 illustrating how mapping logic 500 of FIG. 5 maps physical addresses Aps[2:0] and Apc[2:0] to memory addresses Ams[2:0] and Amc[2:0] when register 505 is loaded with a configuration value Apso=101b.

FIG. 8 is a table 800 illustrating how mapping logic 500 of FIG. 5 maps physical addresses Aps[2:0] and Apc[2:0] to memory addresses Ams[2:0] and Amc[2:0] when register 505 is loaded with a configuration value Apso=100b.

FIG. 9 is a table 900 illustrating how mapping logic 500 of FIG. 5 maps physical addresses Aps[2:0] and Apc[2:0] to memory addresses Ams[2:0] and Amc[2:0] when register 505 is loaded with a configuration value Apso=011b.

FIG. 10 is a table 1000 illustrating how mapping logic 500 of FIG. 5 maps physical addresses Aps[2:0] and Apc[2:0] to memory addresses Ams[2:0] and Amc[2:0] when register 505 is loaded with a configuration value Apso=010b.

FIG. 11 is a table 1100 illustrating how mapping logic 500 of FIG. 5 maps physical addresses Aps[2:0] and Apc[2:0] to memory addresses Ams[2:0] and Amc[2:0] when register 505 is loaded with a configuration value Apso=001b.

FIG. 12 is a table 1000 illustrating how mapping logic 500 of FIG. 5 maps physical addresses Aps[2:0] and Apc[2:0] to memory addresses Ams[2:0] and Amc[2:0] when register 505 is loaded with a configuration value Apso=000b.

DETAILED DESCRIPTION

Figure 1:
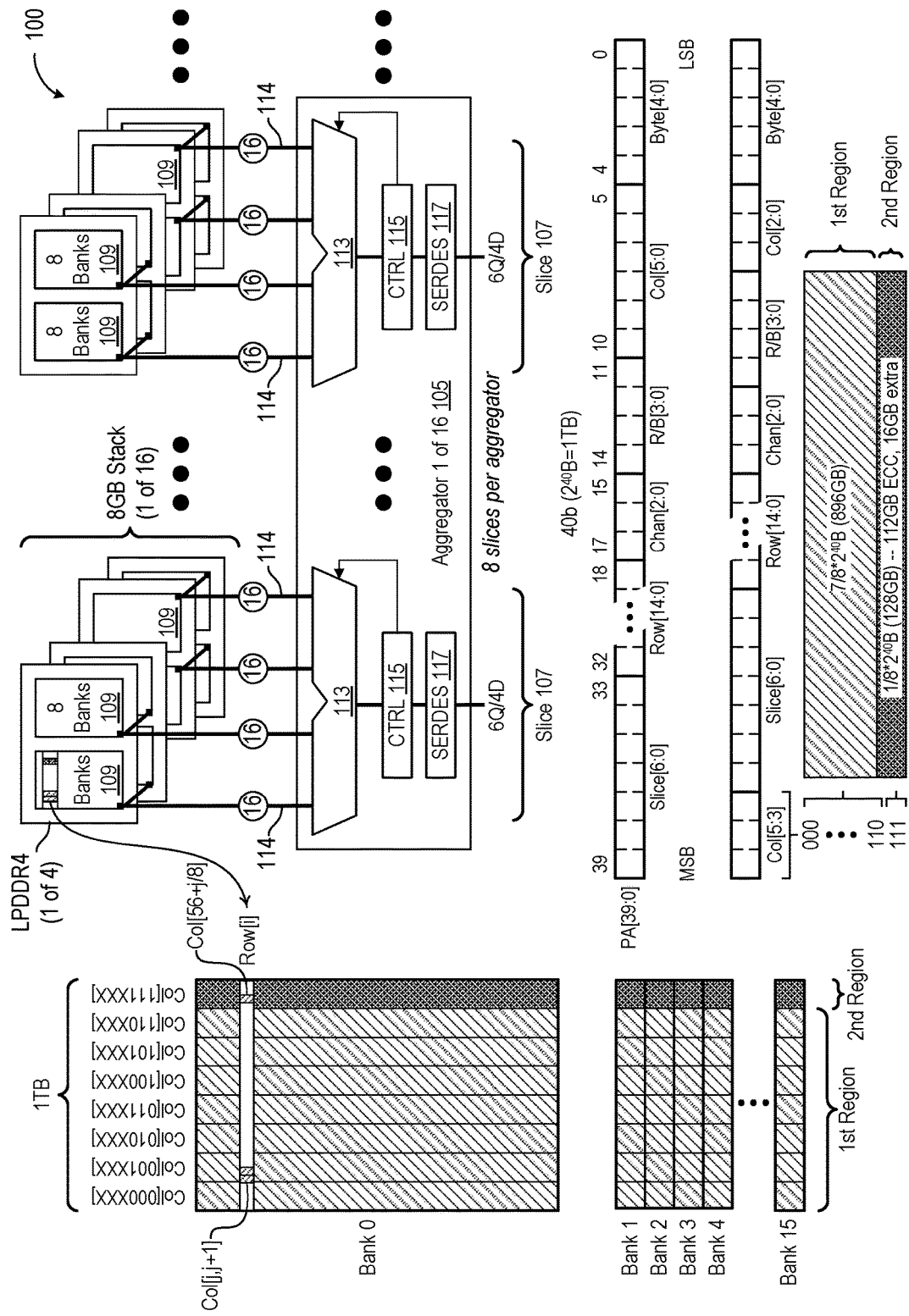
FIG. 1 details a memory system 100 that employs an addressing scheme to logically divide rows of memory cells into separate contiguous regions, one for data storage and another for error detection and correction (EDC) codes corresponding to that data.

FIG. 1 details a memory system 100 that employs an addressing scheme to logically divide rows of memory cells into separate contiguous regions, one for data storage and another for error detection and correction (EDC) codes corresponding to that data. When a given row is opened responsive to an access request for data, the EDC code for that data is in the same row and is thus available without opening another row. Accessing data and corresponding EDC code in the same row of the same bank advantageously saves power and avoids bank conflicts. Moreover, the addressing scheme partitions the memory in support of this efficiency without requiring the processor or controller issuing the access requests to have an understanding of the memory partition. Memory system 100 thus supports a power-efficient EDC scheme that is compatible with legacy systems.

Memory system 100 includes sixteen data aggregators 105, one of which is shown, each servicing memory requests from a memory controller and/or processor (not shown) via eight ten-conductor 6Q/4D primary links. One or more aggregators 105 can be integrated-circuit (IC) memory buffers that buffer and steer signals between an external processor and DRAM components. Each primary link 6Q/4D communicates with a corresponding memory slice 107, each of which includes an 8 GB memory component, a stack of four fourth-generation, low-power, double-data-rate (LPDDR4) memory die in this example. Each LPDDR4 die includes two sets of eight banks 109 coupled to a DRAM interface 113 that communicates data and control signals between the DRAM stacks and a serializer/deserializer SERDES 117 via respective local sixteen-trace channels 114. A local controller 115 in each slice 107 steers data via interface 113 responsive to access requests received from the corresponding 6Q/4D primary link.

In this example, one hundred twenty-eight 8 GB slices 107 provide a total of 1 TB of memory space addressable via forty-bit physical addresses PA[39:0] ($2^{40}$B=1 TB). From the requesting processor's perspective, the seven most-significant bits PA[39:33] specify a slice 107; bits PA[32:18] specify a row Row[i] of memory cells in banks 109; bits PA[17:15] specify a local channel 114; bits PA[14:11] specify a rank/bank; bits PA[10:5] specify a column; and bits PA[4:0] specify a byte. Of the rank/bank bits PA[14:11], three bits identify the rank and one bit distinguishes between two devices per secondary channel.

The external processor employing memory system 100 is configured to perceive memory system 100 as providing 896 GB. This first region, seven eighths of the usable capacity, is available to the external processor via slice-address bits Slice[6:0] in the range from 0000000b to 1101111b. In this context, "usable" memory refers to memory available to the local and remote processors, and is distinct from redundant columns of memory cells and related repair circuitry commonly included in DRAM devices to compensate for defective memory resources (e.g., defective memory cells).

Local controllers 115 can be configured to send an error message responsive to external memory requests that specify a slice address above this range (Slice[6:4] =111XXXXb]). The remaining eighth of the memory capacity, a second region of 112 GB in slice address range Slice[6:0]=111XXXXb, is inaccessible to the external processor but available to local controllers 115 to store e.g. EDC codes. Seven-eighths of the 1 TB of usable storage capacity of memory system 100 is thus allocated for data storage and one eighth reserved for e.g. EDC code storage.

Local controllers 115 remap physical address PA[10:8] to the three MSBs PA[39:37] so that the three MSBs specify the most-significant column-address bits Col[5:3]. The remaining address fields are shifted right three places in this example but can be otherwise rearranged in other embodiments. The three most-significant bits PA[39:37] of the physical address should never be 111b because the remote processor is address constrained to a maximum of 110111b. Because local controllers 115 remap the three most-significant bits to column-address bits Col[5:3], requests directed to memory system 100 will never be directed to column addresses 111XXXb. These high-order column addresses are thus reserved for EDC codes.

In the example of FIG. 1, a read request from an external processor seeks sixty-four bytes (64B) of data from memory system 100. The controller 115 associated with the addressed one of slices 107 uses the remapped physical address to issue successive local read requests to columns Col[j] and Col[j+1] of a row Row[i], receiving 32B for each column access. The controller 115 issues a third local read request to row Row[i] column Col[56+j/8] to read from one column in the second region. Eight bytes of this 32B column access provides an EDC code that the local controller 115 uses to detect and correct for errors. An error-detection code that does not support error correction can also be used.

Local controllers 115 take advantage of the remapped column-address bits to store data and related EDC codes in the same row of the same bank 109. As is typical in DRAM memory devices, a row of memory cells is "opened" in response to an access request, a process in which the values stored in each cell of the open row are sensed and latched. A column address then selects a column of latched bits to communicate via an external bus. Opening a row takes time and power. Reading the latched bits from different columns of the same open row is thus relatively fast an efficient. Likewise, local controllers 115 open only one row to write data and an associated EDC code the controllers 115 calculate from the data using well-known techniques.

Figure 2:
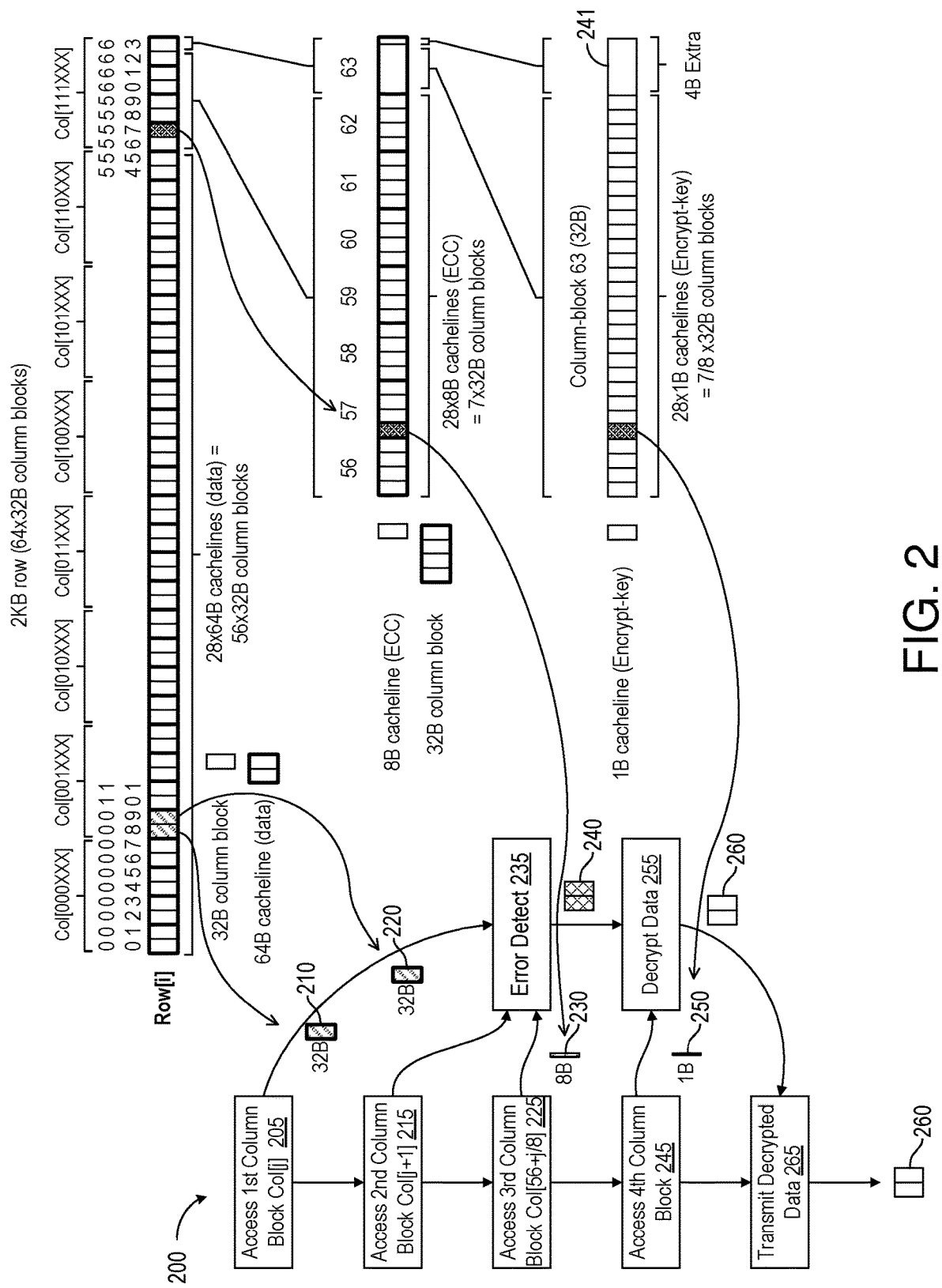
FIG. 2 shows an example of row Row[i] of FIG. 1 with a flowchart 200 outlining a succession of read accesses to that row, all of which can be initiated by a single read request from an external processor seeking 64B of read data.

FIG. 2 shows an example of row Row[i] of FIG. 1 with a flowchart 200 outlining a succession of read accesses to that row, all of which can be initiated by a single read request from an external processor seeking 64B of read data. In this example the read data is encrypted for storage in the first region of the memory. Local controller 115 uses EDC codes and encryption/decryption keys stored in the second region of the memory to both correct for errors and decrypt requested data.

Beginning with step 205, the selected local controller 115 directs a first access request to column Col[001000b] (or Col[08] decimal), receiving an encrypted 32B column block 210 in response. Local controller 115 sends a second read request 215 to column Col[001001b] (Col[09]) of the same row Row[i] to obtain a second encrypted 32B column block 220. A third read access 225 to Col[111001b] (Col[57]) reads a 32B column block comprised of four 8B cachelines, one cacheline for each pair of columns Col[001XXXb]. The selected local controller 115 uses the 8B EDC cacheline 230 associated with columns Col[001000b,0010001b] to detect and correct for errors (235) in column blocks 210 and 220, and thus to provide 64B of error-corrected data 240.

In this embodiment the error corrected data is encrypted, and column Col[111111b] (Col[63]) stores 28 byte-wide keys, one for each pair of columns in the first region, leaving an extra four bytes 241 for other purposes. In step 245, the selected local controller 115 reads the 1B key 250 associated with columns Col[001000b,0010001b] to decrypt error-corrected data 240 (process 255) and thus provide 64B of error-corrected, decrypted data 260. This data is passed to the SERDES 117 in the selected slice 107 and transmitted to the external processor that conveyed the initial read request (step 265). The order of column accesses to the same row can be different in other embodiments.

Figure 3:
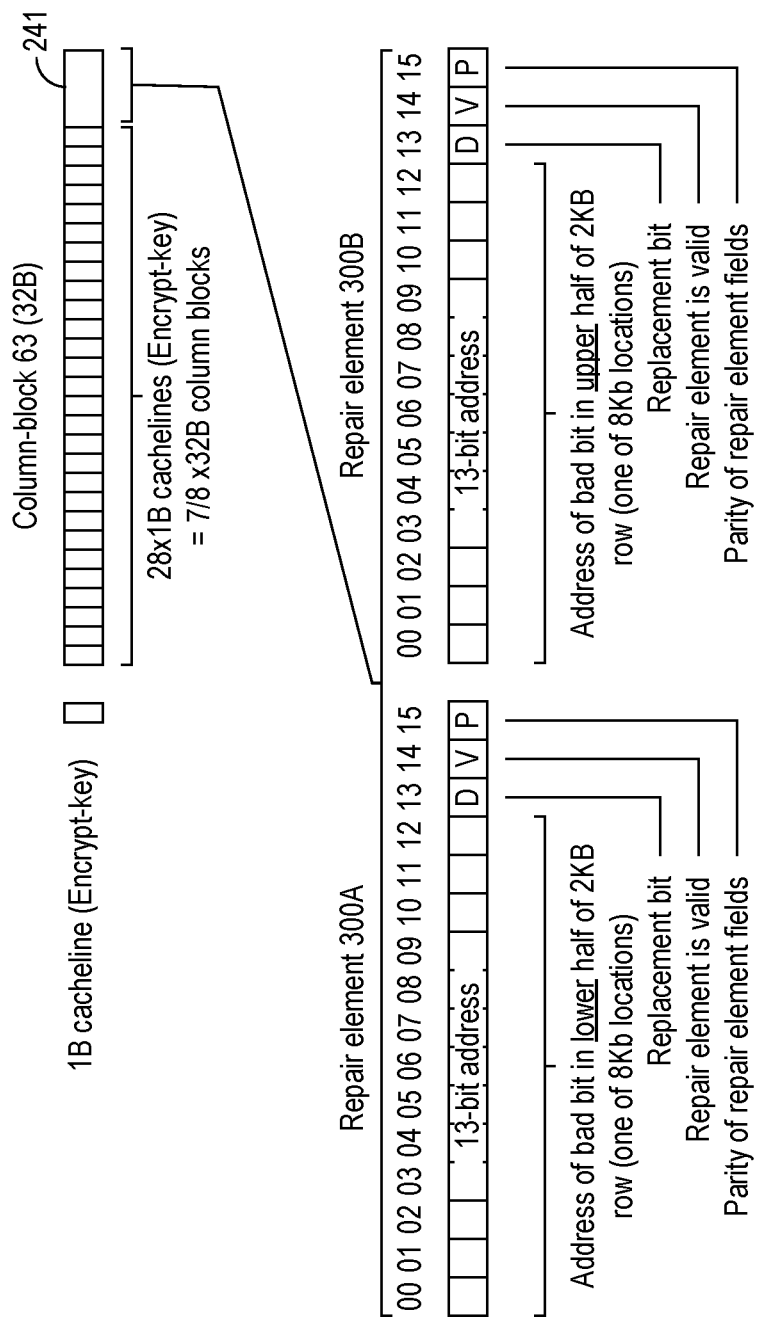
FIG. 3 illustrates how the extra four bytes 241 of 32B column-block Col[63] is used to store repair elements in one embodiment.

FIG. 3 illustrates how the extra four bytes 241 of 32B column-block Col[63] is used to store repair elements in one embodiment. Each 2 KB ($2^{14}$b) row includes two 16-bit repair elements 300A and 300B, one to substitute for one erroneous bit from the lower $2^{13}$ bits in the same row and another to substitute one erroneous bit from the upper $2^{13}$ bits. The same column access that provides the decryption key also yields repair elements 300A and 300B, which local controller 115 associates with respective halves of the bit addresses and employs to store replacement bits for defective bit addresses.

Local controller 115 can uses repair element 300A (300B) to store: (1) a 13-bit address to identify a defective bit location in the lower half (upper half) of the corresponding row; (2) a replacement bit D to replace a suspect bit read from the defective location; (3) a valid bit V set when local controller 115 noted the defective location and employed the repair element; and (4) a parity bit P local controller 115 set to one or zero during writes to the repair element such that the sum of the set of bits in the repair element is always even (or odd).

During a read transaction, local controller 115 considers whether either or both repair elements corresponds to a bit address retrieved in any column access of the pending transaction. If so, and if the valid and parity bits V and P indicate the availability of a valid, error-free replacement bit D, then control logic 115 substitutes the bit read from the defective location with replacement bit D. Control logic 115 may await consideration of repair elements 300A and 300B before applying ECC and decryption steps. For reduced latency, ECC and decryption steps may begin before and during consideration of repair elements 300A and 300B to be repeated with a replacement bit if a corresponding repair element is noted.

Figure 4:
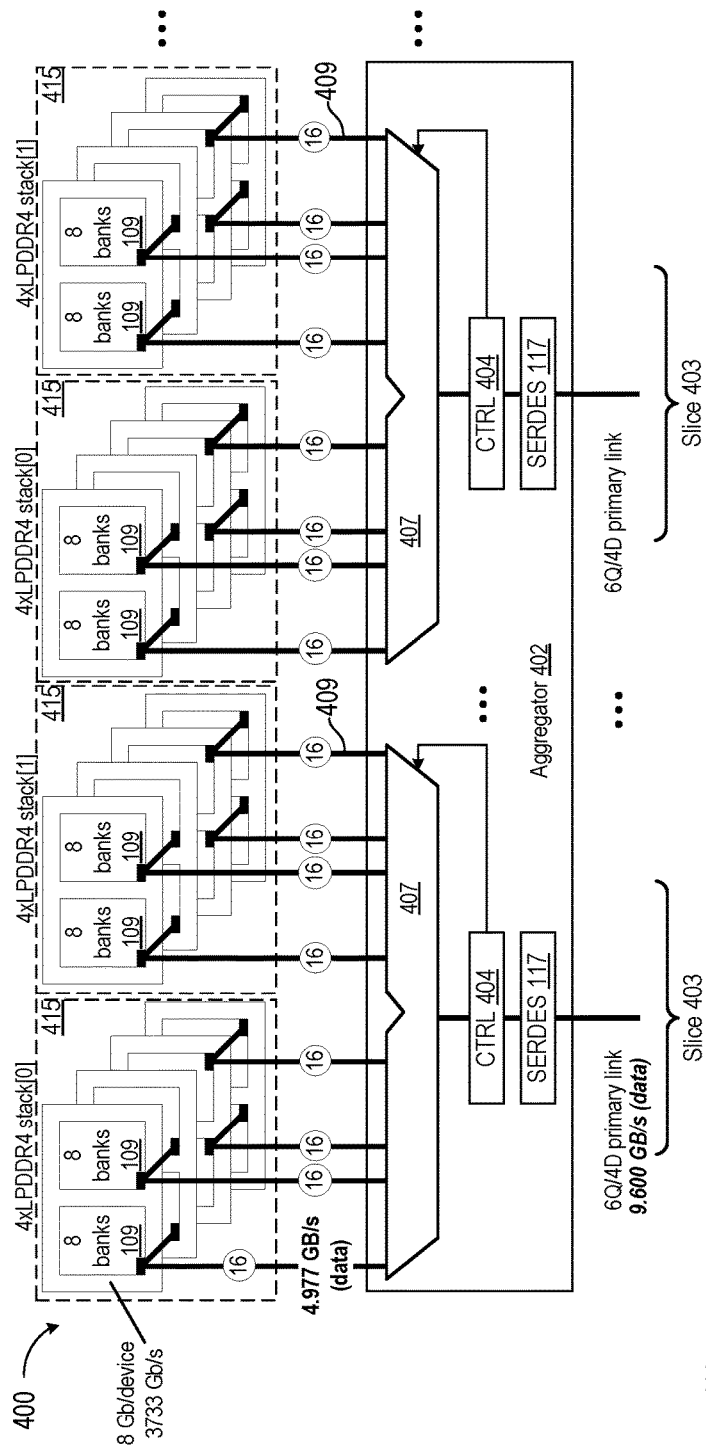
FIG. 4 details a memory system 400 that employs an addressing scheme similar to the one detailed above in connection with FIG. 1.

FIG. 4 details a memory system 400 that employs an addressing scheme similar to the one detailed above in connection with FIG. 1. Memory system 400 includes some number of aggregators 402, one of which is shown, each servicing memory requests from an external processor (not shown) via eight ten-conductor 6Q/4D primary links. Each primary link 6Q/4D communicates with a corresponding memory slice 403, each of which includes two 8 GB memory components, a stack of four fourth-generation, low-power, double-data-rate (LPDDR4) memory die in this example. Each LPDDR4 die includes two sets of eight banks 109 coupled to a DRAM interface 407 that communicates data and control signals between the DRAM stacks and a serializer/deserializer SERDES 117 via respective local sixteen-trace channels 409. A local a local controller 404 in each slice 403 steers data via interface 407 responsive to access request received from the corresponding 6Q/4D primary link.

Control logic (FIG. 5) within each local controller 404 alters the addressing scheme for local memory accesses responsive to a control value Apso that can be stored in a local configuration register (FIG. 5) to support 2, 4, 6, 8, 10, 12, 14, or 16 aggregators 402 and associated memory resources. This memory scheme therefore offers a range of available memory, as summarized in a table 420. The addressing scheme and related circuitry of system 400 can be used when the number of memory components (e.g. LPDDR4 stacks 405) is not a power of two.

Table 420 highlights a configuration corresponding to Apso value six (110b) in which fourteen aggregators 402 each support eight slices 403, and each slice provides access to two stacks 415 of four 8 GB memory devices, providing 896 GB of usable memory. Of this memory, $56/64$th is used for data storage and $7/64$th for EDC. The remaining $1/64$th is available for other uses. Each of the 112 6Q/4D primary links provides a data bandwidth of 9.6 GB/s for a total primary data bandwidth of 1,075 GB/s. Each secondary link provides a data bandwidth of 4.977 GB/s for a total secondary bandwidth of 4459 GB/s.

Figure 5:
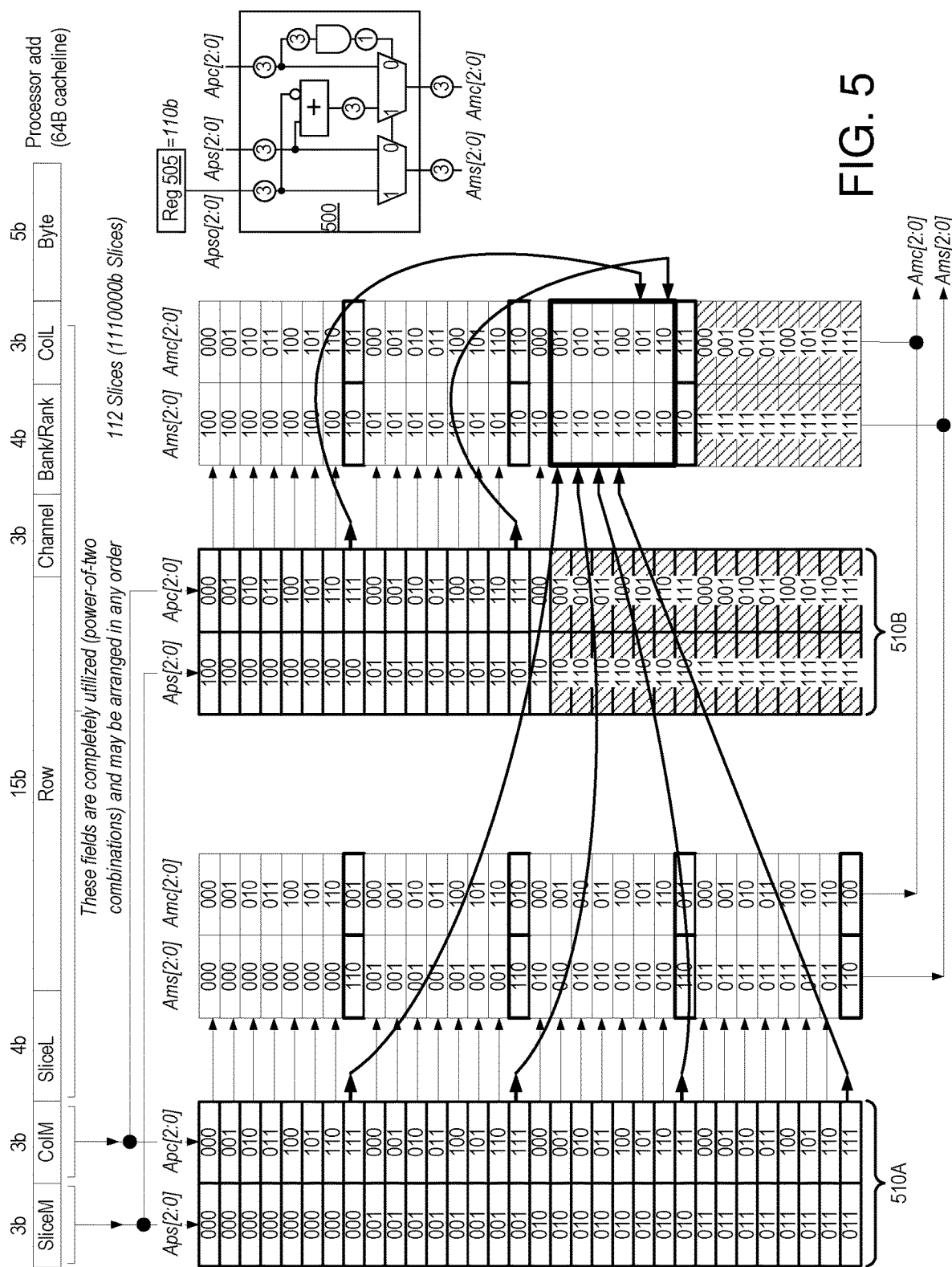
FIG. 5 illustrates how mapping logic 500 remaps physical addresses PA[39:0] responsive to an Apso configuration value stored in a local register 505, an Apso value of six in this configuration.

FIG. 5 illustrates how mapping logic 500 remaps physical addresses PA[39:0] responsive to an Apso configuration value stored in a local register 505, an Apso value of six in this configuration. A forty-bit physical address PA[39:0] (FIG. 1) arriving with an external memory request is remapped such that the three most-significant column bits ColM lie between the three most-significant slice bits SliceM and the four least-significant slice bits SliceL.

Slice bits SliceM are conveyed as physical slice address Aps[2:0] and column bits ColM are conveyed as physical column address Apc[2:0]. These six bits define sixty-four blocks in processor address space 510A/B. The region of processor address space 510A/B unavailable to the external processor is cross-hatched in space 510B.

Mapping logic 500 remaps addresses in which column address ColM is 111b to a higher address range, as indicated by arrows, to reserve column addresses Col[111XXXb] for EDC values, etc., as detailed in connection with memory system 100 of FIG. 1. Referring to mapping logic 500, when column address ColM is any value other than 111b physical slice address Aps[2:0] is used as the high-order memory slice address Ams[2:0] and physical column address Apc[2:0] is used as the high-order memory column address Amc[2:0]. When column address ColM is 111b, an AND gate causes a pair of multiplexers to substitute physical slice address Aps[2:0] for the value in register 505 and to change column address Apc[2:0] to a sum of slice address Aps[2:0] and the inverse of the Apso value in register 505.

FIG. 6 is a table 600 illustrating how mapping logic 500 of FIG. 5 maps physical addresses Aps[2:0] and Apc[2:0] to memory addresses Ams[2:0] and Amc[2:0] when register 505 is loaded with a configuration value Apso=111b. Address space unavailable to the requesting processor is crossed out. All of the available memory is available to the local controller.

FIG. 7 is a table 700 illustrating how mapping logic 500 of FIG. 5 maps physical addresses Aps[2:0] and Apc[2:0] to memory addresses Ams[2:0] and Amc[2:0] when register 505 is loaded with a configuration value Apso=101b. Address space unavailable to the requesting processor and local controller is crossed out.

FIG. 8 is a table 800 illustrating how mapping logic 500 of FIG. 5 maps physical addresses Aps[2:0] and Apc[2:0] to memory addresses Ams[2:0] and Amc[2:0] when register 505 is loaded with a configuration value Apso=100b. Address space unavailable to the requesting processor and local controller.

FIG. 9 is a table 900 illustrating how mapping logic 500 of FIG. 5 maps physical addresses Aps[2:0] and Apc[2:0] to memory addresses Ams[2:0] and Amc[2:0] when register 505 is loaded with a configuration value Apso=011b. Address space unavailable to the requesting processor and local controller is crossed out.

FIG. 10 is a table 1000 illustrating how mapping logic 500 of FIG. 5 maps physical addresses Aps[2:0] and Apc[2:0] to memory addresses Ams[2:0] and Amc[2:0] when register 505 is loaded with a configuration value Apso=010b. Address space unavailable to the requesting processor and local controller is crossed out.

FIG. 11 is a table 1100 illustrating how mapping logic 500 of FIG. 5 maps physical addresses Aps[2:0] and Apc[2:0] to memory addresses Ams[2:0] and Amc[2:0] when register 505 is loaded with a configuration value Apso=001b. Address space unavailable to the requesting processor and local controller is crossed out.

FIG. 12 is a table 1000 illustrating how mapping logic 500 of FIG. 5 maps physical addresses Aps[2:0] and Apc[2:0] to memory addresses Ams[2:0] and Amc[2:0] when register 505 is loaded with a configuration value Apso=000b. Address space unavailable to the requesting processor and local controller is crossed out.

Figure 13:
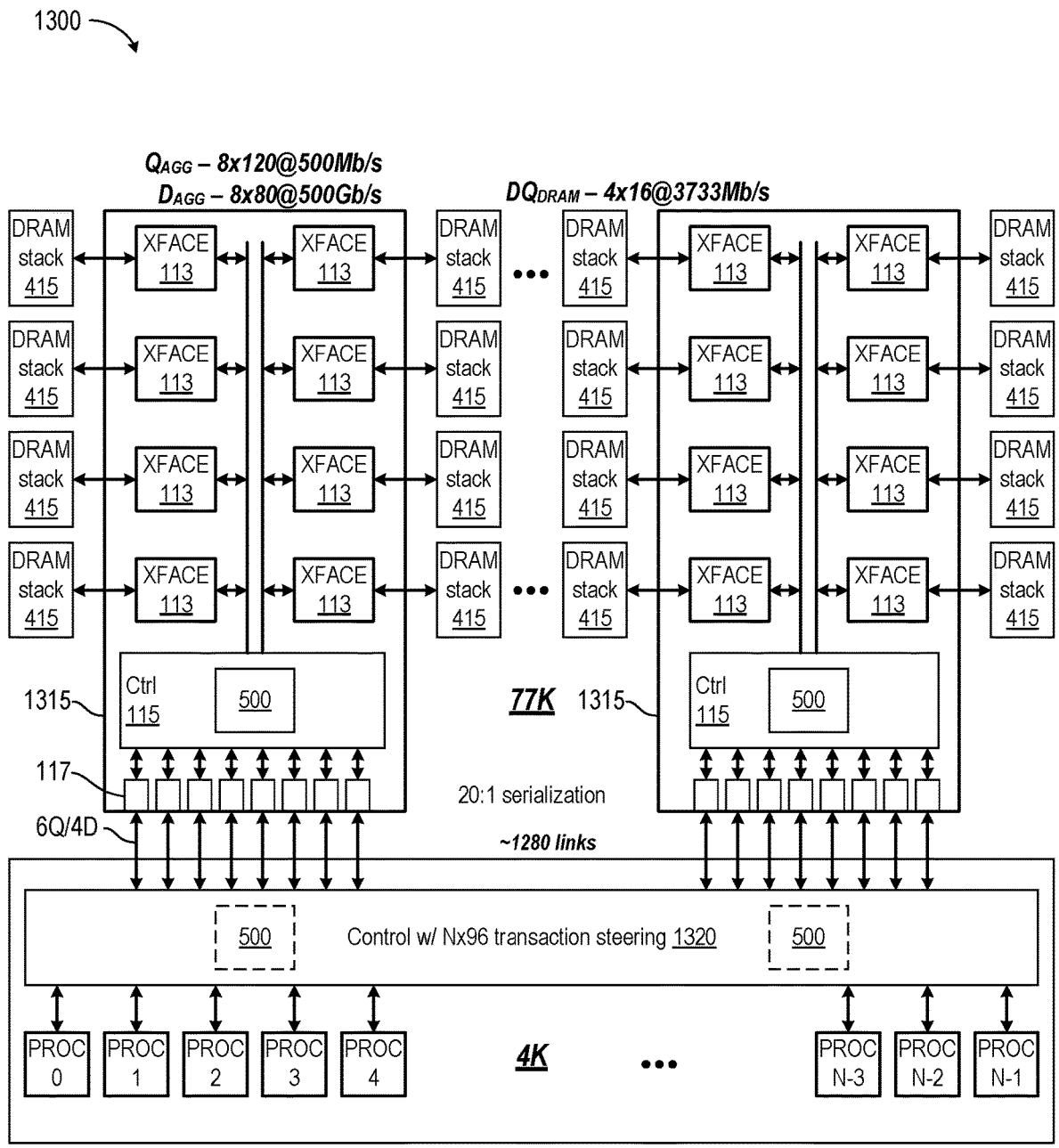
FIG. 13 depicts a cold memory system 1300 in accordance with one embodiment.

FIG. 13 depicts a cold memory system 1300 in accordance with one embodiment. The adjective "cold" refers to operating temperature. The memory subsystem operates at e.g. 77K, whereas the processor subsystem operates at e.g. 4K. Memory system 1300 includes sixteen aggregators 1315 in the 77K domain, each connected to the 4K domain via eight primary 6Q/4D links. As in the example of FIGS. 4 and 5, mapping logic 500 is part of local controller 115. In other embodiments some or all of this control functionality is provided on a primary controller 1320 in the 4K domain that serves e.g. N processors that initiate memory transactions with the DRAM stacks in the manner detailed previously. When mapping logic 500 is placed in aggregators 1315, the different capacity cases adjusts the number of stacks per aggregator {2, 4, 6, 8, 10, 12, 14, 16} and the number of 6Q/4D LINK groups per aggregator {1, 2, 3, 4, 5, 6, 7, 8}. The number of aggregators 1315 is fixed at sixteen. When mapping logic 500 is placed in the steering logic in 4K domain, the different capacity cases adjusts the number of aggregators {2, 4, 6, 8, 10, 12, 14, 16}. The number of 6Q/4D link groups per aggregator 1315 is fixed at eight, and the number of stacks 415 per aggregator 1315 is fixed at sixteen. In either case the six Q links for each 6Q/4D slice communicate 8×6 bits at 10 Gb/s, whereas the four D links communicate 8×4 bits at 10 Gb/s.

Figure 14:
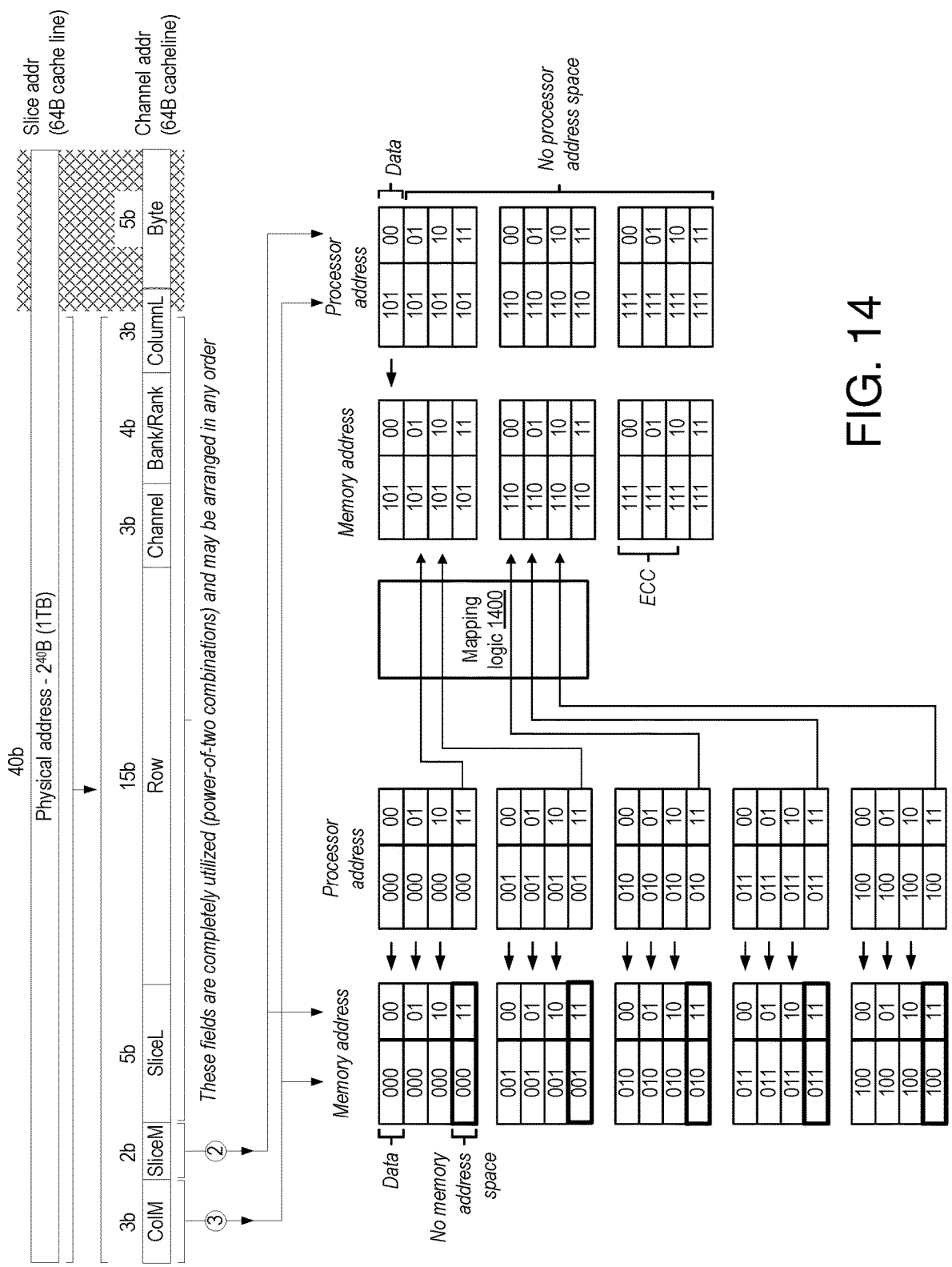
FIG. 14 depicts an address-mapping scheme in accordance with another embodiment that performs three column transactions per row activation.

FIG. 14 depicts an address-mapping scheme in accordance with another embodiment that performs three column transactions per row activation. Mapping logic 1400 maps the three most-significant bits of the physical address to the three most-significant column-address bits ColM and the next two bits to the two most-significant slice bits SliceM.

The memory system employing this scheme is assumed to have a number of slices that is not a power of two, ninety-six in this example. The address-mapping scheme of FIG. 14 is similar to that of FIG. 4 except that the column and slice fields are reversed, and the slice field uses but two bits. Mapping logic 1400 uses high-order address blocks to fill holes in the memory address space.

Figure 15:
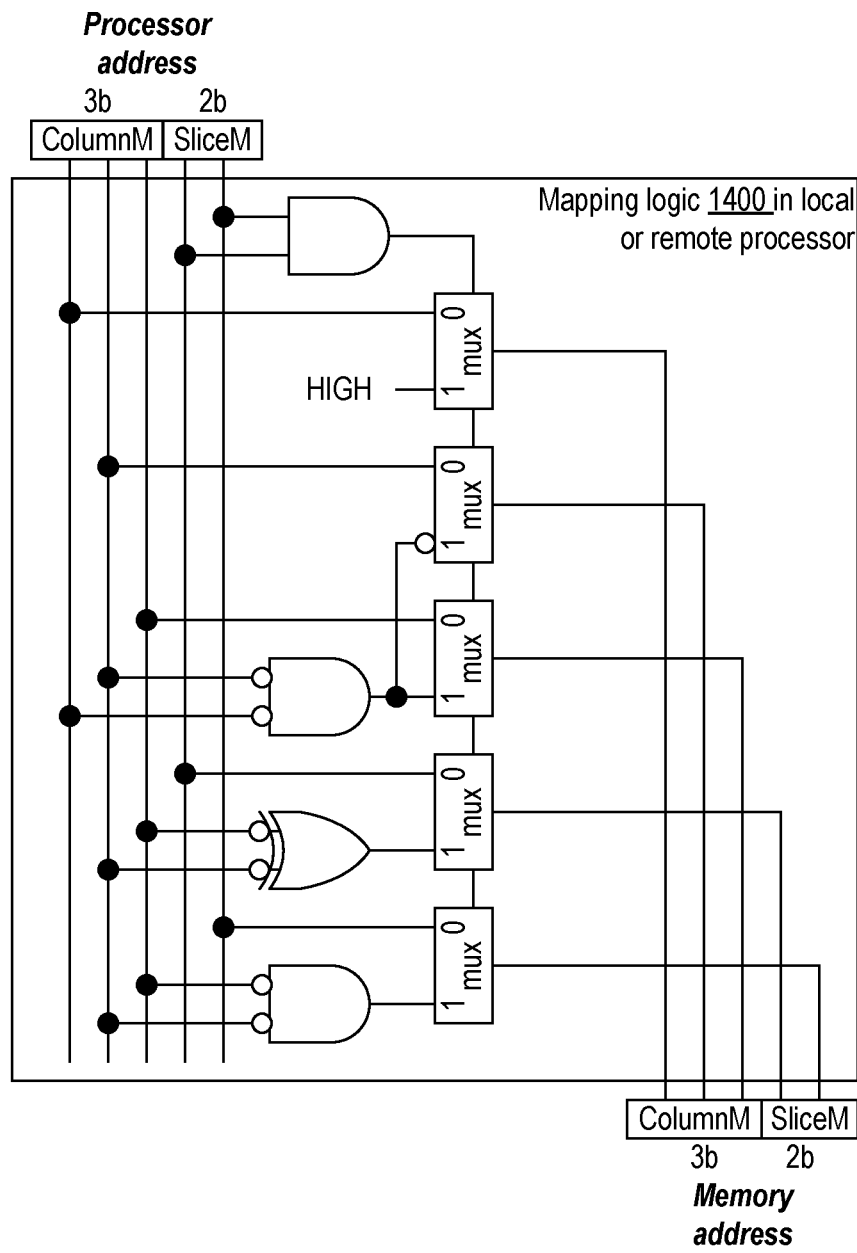
FIG. 15 details an embodiment of mapping logic 1400 of FIG. 14.

FIG. 15 details an embodiment of mapping logic 1400 of FIG. 14. Mapping logic 1400 is simpler than mapping logic 500 of the prior embodiment, but becomes more complex if the SliceM field is extended to three or more bits.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An integrated-circuit (IC) memory buffer comprising:
    an external interface to receive external memory requests each specifying a memory address within a range of memory addresses corresponding to a first memory region;
    a memory interface to issue successive local memory requests responsive to each of the external memory requests, the successive local memory requests including:
        a first local memory request specifying a row address and a first column address within the first memory region;
        a second local memory request specifying the row address and a second column address within the first memory region; and
        a third local memory request specifying the row address and a third column address corresponding to a second memory region outside of the first memory region.

2. The memory buffer of claim 1, wherein the third column address is a function of the first column address.

3. The memory buffer of claim 2, wherein the second column address is offset from the first column address by one column bit.

4. The memory buffer of claim 1, wherein the memory address includes most-significant bits and the memory interface extracts the column address from the most-significant bits.

5. The memory buffer of claim 4, wherein the third column address is greater than the highest value of the most-significant bits of the memory address.

6. The memory buffer of claim 5, further comprising mapping logic to selectively map the most-significant bits of the memory address to the first column address of the first local memory request.

7. The memory buffer of claim 6, further comprising a configuration register coupled to the mapping logic to store value for selectively mapping the most-significant bits of the memory address to the first column address of the first local memory request.

8. The memory buffer of claim 1, further comprising a local controller coupled to the memory interface, the local controller to read first data from the specified row address and first column address in the first memory region, second data from the specified row address a second column address in the first memory region, and an error detection code from the specified row address and the third column address in the second memory region.

9. The memory buffer of claim 8, the local controller to read a decryption key from the specified row address and the third column address in the second memory region.

10. The memory buffer of claim 9, wherein the local controller decrypts at least one of the first data and the second data with the decryption key.

11. A method of accessing a memory having memory cells arranged in rows and columns, the method comprising:
    receiving an access request specifying a physical address within a range of memory addresses corresponding to a first region of the memory;
    responsive to the access request,
        transmitting a first read request to one of the rows and a first of the columns of the memory in the first region of the memory;
        receiving data from the one of the rows and the first of the columns responsive to the first read request;
        transmitting a second read request to the one of the rows and a second column of the memory in a second region of the memory outside of the first region of the memory;
        receiving an error-correction code from the one of the rows and the second column of the memory responsive to the second read request; and
        applying the error-correction code to the data to produce corrected data.

12. The method of claim 11, further comprising transmitting a third read request to the one of the rows and a third of the columns of the memory and receiving second data from the one of the rows and the third of the columns of the memory responsive to the third read request.

13. The method of claim 12, further comprising applying the error-correction code to the second data.

14. The method of claim 12, wherein the third of the columns of the memory is in the first region of the memory.

15. The method of claim 11, further comprising receiving a decryption key from the one of the rows and the second column of the memory and decrypting at least one of the data and the corrected data with the key.

16. The method of claim 11, wherein the first read request comprises a first column address of the first column of the memory and the second read request comprising a second column address in the second region of the memory, the method further comprising calculating the second column address from the first column address.

17. The method of claim 11, wherein the physical address includes most-significant bits and the first read request includes a column address specifying the first of the columns, the method further comprising extracting the column address from the most-significant bits.

18. The method of claim 17, wherein the second read request includes a second column address specifying the second of the columns, and wherein the second column address is greater than the highest value of the most-significant bits of the memory address.

19. A memory controller for accessing a memory having memory cells arranged in rows and columns, the memory controller comprising:
   an external interface to receive external memory requests each specifying a memory address within a range of memory addresses corresponding to a first region of the memory;
   request means for issuing local memory requests responsive to each of the external memory requests, each of the local memory requests including:
      a first read request to read data from one of the rows and a first of the columns of the memory in the first region of the memory; and
      a second read request to read an error code from the one of the rows and a second column of the memory in a second region of the memory outside of the first region of the memory; and
   error-detection means for applying the error code to the data.

20. The memory controller of claim 19, the error-detection means to apply the error code to the data to correct the data.

* * * * *